Dec. 15, 1970   D. C. HANNA   3,546,728
CAR WINDOW BRUSHING UNIT
Original Filed Nov. 13, 1967   2 Sheets-Sheet 1

DANIEL C. HANNA
INVENTOR
BY
BUCKHORN, BLORE, KLARQUIST & SPARKMAN
ATTORNEYS

Dec. 15, 1970  D. C. HANNA  3,546,728
CAR WINDOW BRUSHING UNIT
Original Filed Nov. 13, 1967  2 Sheets-Sheet 2
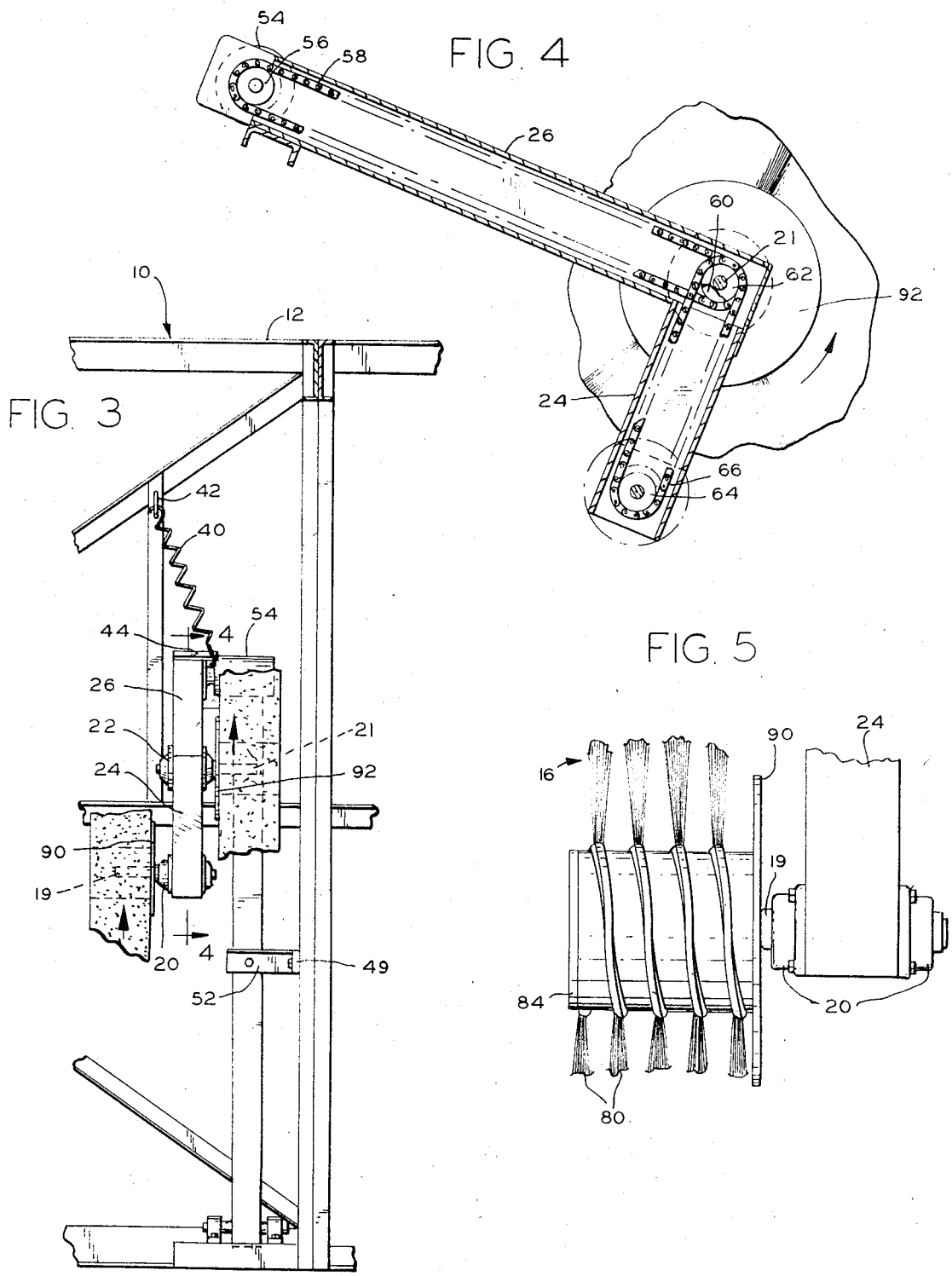
DANIEL C. HANNA
INVENTOR
BY
BUCKHORN, BLORE, KLARQUIST & SPARKMAN
ATTORNEYS United States Patent Office 3,546,728
Patented Dec. 15, 1970

3,546,728
CAR WINDOW BRUSHING UNIT
Daniel C. Hanna, 1133 Riverton Drive,
Portland, Oreg. 97201
Continuation of application Ser. No. 682,117, Nov. 13, 1967. This application June 27, 1969, Ser. No. 842,784
Int. Cl. B60s 3/06
U.S. Cl. 15—21                                  13 Claims

ABSTRACT OF THE DISCLOSURE

A brushing unit 10 includes an open frame 12 bolted into an arch 14. A smaller lower brush 16 and a larger upper brush 18 are mounted at opposite ends of tubular housing arm 24 carried by tubular housing arm 26 carried by vertical angular arm 32 pivotally mounted by a shaft 34 on the frame. A counterbalancing spring 40 urges the arm toward a slightly inclined position engaging a rubber bumper 46 and away from a more inclined position engaging a rubber bumper 50. However, the weight of the brushes and the arms 24 and 26 just overcomes the force of the spring to normally lightly hold the arm 32 against the bumper 50. A motor 54 bolted to one side of the arm 26 drives chain and sprocket drive trains in the houisng arms 26 and 24 to rotate the brushes. The brushes are rotated so as to sweep upwardly against a side of a car moved past the brushes to thoroughly brush all of the sill portion, the side windows, and the window frame portions of the car. The brushes have bunches of long bristles secured to hubs in spirals of the same direction and of pitches such that, as the car is moved laterally past the brushes, an aerial and any side mirrors move along in the spaces between turns of the spirals and no damage is done to these car accessories. Flexible rubber discs keep the bristles of the two brushes from intertangling.

---

This application is a continuation of copending application Ser. No. 682,117, filed Nov. 13, 1967, now abandoned.

DESCRIPTION

This invention relates to a car window brushing unit, and more particularly to a dual brush car window brushing unit.

An object of the invention is to provide a new and improved car window brushing unit.

Another object of the invention is to provide a dual brush car window brushing unit.

A further object of the invention is to provide a car window brushing unit in which brushes comb past aerials and rear view mirrors mounted at the sides of cars.

Another object of the invention is to provide a car window brushing unit which automatically completely brushes windows of cars of widely varying widths and heights.

Another object of the invention is to provide a car window brushing unit of the module type which can be installed as a unit in a car washing arch.

The invention provides a car window brushing unit preferably having bristles of a brush arranged in a spiral and rotated in a direction such that a car accessory near the side of a car travels along the space between turns of the spiral as the car is advanced past the brush. Preferably the brush is mounted floatingly by a counterbalanced pivotal arm and is urged toward the car. The pivotal arm is carried by a frame unit which may be installed in and moved from a car washing arch as a unit.

A complete understanding of the invention may be obtained from the following detailed description of a car window brushing unit forming a specific embodiment thereof, when read in conjunction with the appended drawings, in which:

FIG. 3 is a fragmentary vertical sectional view taken along line 3—3 of FIG. 1;

FIG. 4 is an enlarged vertical sectional view taken along line 4—4 of FIG. 3; and FIG. 5 is an enlarged, fragmentary, side elevation view taken along line 5—5 of FIG. 1.

Figure 1:
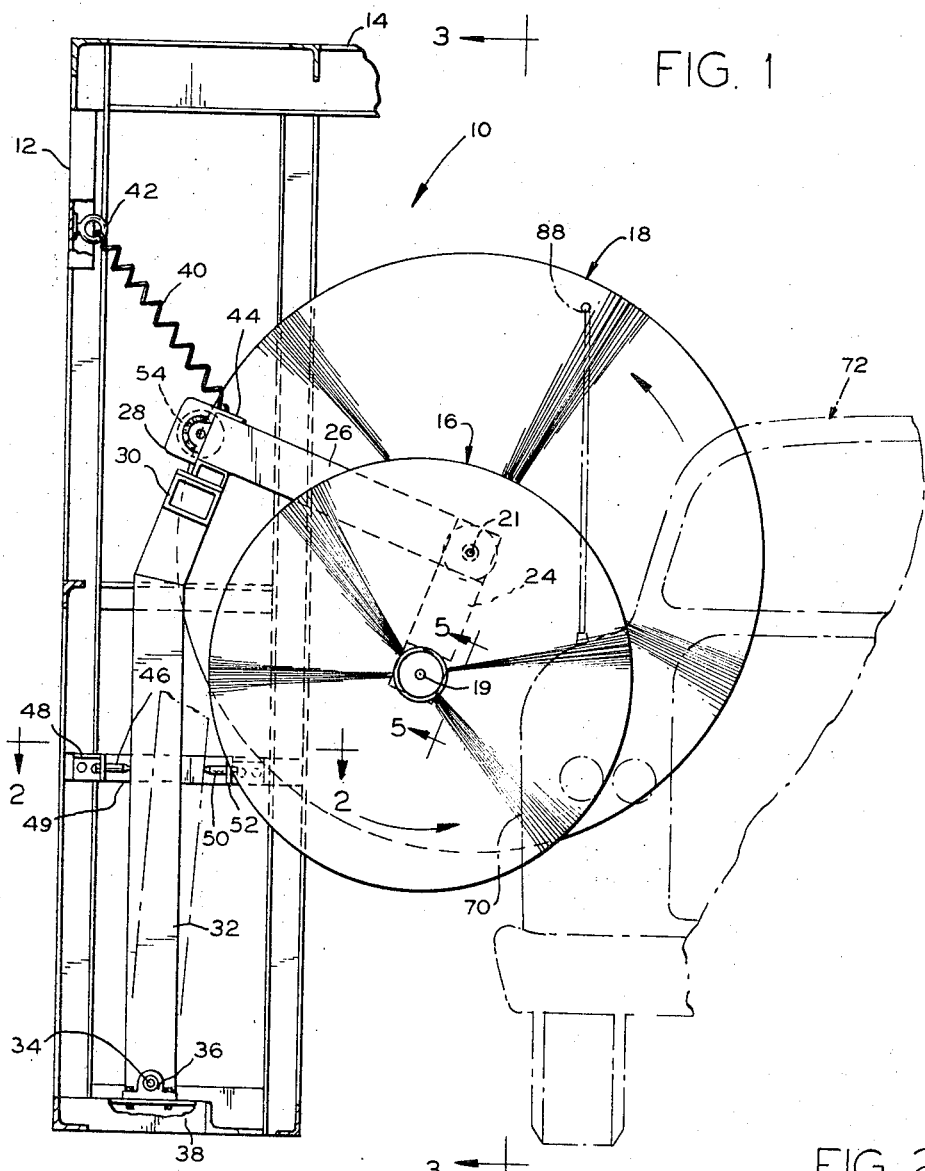
FIG. 1 is a front elevation view of a car window brushing unit forming one embodiment of the invention.
Figure 2:
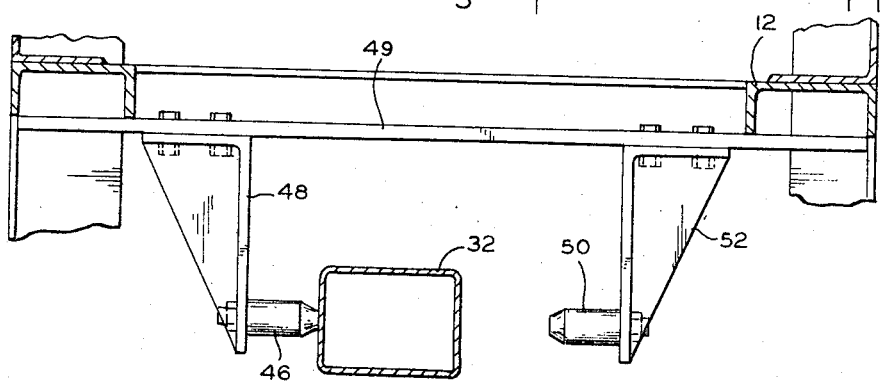
FIG. 2 is an enlarged horizontal sectional view taken along line 2—2 of FIG. 1.

Referring now in detail to the drawings, a brushing unit 10 forming one embodiment of the invention includes an open, module type frame 12 adapted to be bolted as a unit into an arch 14. A smaller lower brush 16 and a larger upper brush 18 are keyed to shafts 19 and 21 journaled by pairs of bearings 20 and 22 mounted at opposite ends of tubular housing arm 24 secured rigidly to the end of tubular housing arm 26 secured rigidly to a spacer 28 and a cross arm 30 integral with vertical angular arm 32 pivotally mounted by a shaft 34 in bearings 36 secured to a base 38 of the frame 12. A counterbalancing spring 40 secured between an eye 42 on the frame and an eye 44 on the arm 26 urges the arm 26 toward a slightly inclined position engaging a rubber bumper 46 mounted on bracket 48 bolted to a cross member 49 of the frame and away from a more inclined position engaging a rubber bumper 50 mounted on a bracket 52 bolted to the frame. However, the weight of the brushes 16 and 18 and arms 24 and 26 just overcomes the force of the spring to normally lightly hold the arm 32 against the bumper 50.

A hydraulic or electric motor 54 bolted to one side of the arm 26 drives a sprocket 56 in the housing arm 26 to drive a chain 58 to drive a sprocket 60 keyed to shaft 21, which drives shaft 19 through sprockets 62 and 64 and a chain 66 all enclosed in the tubular housing arms 24 and 26. The brushes 16 and 18 are rotated so as to sweep upwardly against a side 70 of a car 72 moved past the brushes to thoroughly brush all of the sill portion, the side windows, and the window frame portions of the car. The brushes 16 and 18 have bunches of long bristles 80 and 82 secured to hubs 84 and 86 in spirals of the same direction and of pitches such that, as the car is moved laterally past the brushes, an aerial 88 and any side mirrors (not shown) move along in the spaces between turns of the spirals and no damage is done to these car accessories. Flexible rubber discs 90 and 92 keep the bristles of the two brushes from intertangling. The lengths of the bristles are several times as great as the diameters of the hubs, and the respective diameters of the brushes 16 and 18, for best results, are thirty-six inches and fifty inches. The brush 16 brushes the portions of the car below the windows and the lower portions of the windows, and the brush 18 brushes the entire windows and the portions of the car above the windows.

The arm 32 is movable between the extreme retracted position engaging the bumper 46 and the extreme forward position engaging the bumper 50. The arm 32 may be held manually or by a selectively operated cylinder device (not shown) in its retracted position to hold the brushes 16 and 18 completely out of the path of trucks, but, in normal operation, the arm is biased lightly toward its forward position, in which position the brushes are low and substantially into the path of the cars so as to cover thoroughly the window areas of narrow and low cars. In brushing a car of normal width and height, the reaction of the car on the brushes moves the arm to the intermediate position shown in FIG. 1 in which the brushes are optimumly positioned to clean the side windows and the areas of the car surrounding the side windows. The brushes are continuously driven and feeler-actuated devices or the like are required to move the arm to proper brushing positions.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a car wash apparatus,
carrier means,
a first rotary brush,
a second rotary brush,
mounting means mounting the brushes rotatably on the carrier means in longitudinally spaced and radially offset, overlapping positions,
moving means for moving the carrier means toward the path of a car,
and drive means for rotating the brushes,
the brushes having bristles mounted in spirals extending in a direction such that projections on the car are threaded past the bristles as the car is moved along said path in a predetermined direction and at a predetermined speed.

2. The car wash apparatus of claim 1 wherein the mounting means mounts the carrier means for movement of the brushes against the upper side area of the car as the car is advanced along said path.

3. The car wash apparatus of claim 2 wherein the carrier means and the mounting means comprise a generally L-shaped arm carrying the brushes and means mounting the arm pivotally.

4. The car wash apparatus of claim 3 wherein the arm is mounted so as to be biased by gravity toward said path.

5. The car wash apparatus of claim 4 including spring means urging the arm in a direction away from said path.

6. The car wash apparatus of claim 3 including means for limiting movement of the arm toward said path.

7. In a car wash apparatus,
carrier means,
means mounting the carrier means for movement toward and away from a car moved along a predetermined path past the carrier means at a predetermined speed,
a rotary brush carried by the carrier means for rotation about a horizontal axis and having bristles arranged in a spiral for engaging the car,
and means for rotating the brush about said axis in such a direction and at such a speed that the spirally arranged brushes thread past projections on the car.

8. The car wash apparatus of claim 7 wherein the brush is urged against the side window and sill area of the car and the bristles engaging the car are moved upwardly.

9. In a car wash apparatus,
a generally vertical arm member,
a first rotary brush of a predetermined diameter,
a second rotary brush of a diameter substantially smaller than said predetermined diameter,
means mounting the first rotary brush on the upper portion of the arm member at one side thereof for rotation on a horizontal axis spaced above the window sill height of a car to be washed,
means mounting the second rotary brush on the lower portion of the arm member at the opposite side thereof for rotation on an axis positioned at a level not substantially higher than said window sill height and parallel to said horizontal axis,
moving means for moving the arm member so as to move the brushes downwardly and toward the side of the car as the car is moved along a predetermined path to move the first rotary brush into engagement with the side window and sill of the car and the second rotary brush against the sill and the side portion of the car below the sill,
and drive means for rotating the brushes.

10. The car wash apparatus of claim 9 wherein the drive means rotates the brushes in the same direction such that the portions of the brushes engaging the car are moving upwardly.

11. In a car wash apparatus,
a generally vertical arm member,
a first rotary brush,
a second rotary brush,
the brushes having bristles arranged in spiral rows extending in the same direction,
means mounting the first rotary brush on the upper portion of the arm member at one side thereof for rotation on a horizontal axis above the window sill height of a car to be washed, with the first rotary brush extending a predetermined distance toward the path of the car,
means mounting the second rotary brush on the lower portion of the arm member at the opposite side thereof for rotation on an axis not higher than said window sill height and parallel to said horizontal axis with the second rotary brush extending a lesser distance toward the path of the car,
moving means for urging the arm member toward the side of the car moved along said path to urge the first rotary brush against the side window and the sill of the car and the second rotary brush against the sill and the side portion of the car below the sill,
and drive means for rotating the brushes.

12. In a car wash apparatus,
carrier means,
a rotary brush,
mounting means mounting the brush rotatably on the carrier means for rotation on a horizontal axis,
moving means for moving the carrier means toward the path of a car,
and drive means for rotating the brush,
the brush having bristles mounted in a spiral extending in a direction such that projections on the car are threaded past the bristles as the car is moved along said path in a predetermined direction and at a predetermined speed.

13. In a car wash apparatus,
carrier means mounted at the side of a path along which a car to be washed moves,
a first rotary brush,
a second rotary brush,
means mounting the first rotary brush on the carrier means for rotation on a horizontal axis at a predetermined height,
means mounting the second rotary brush on the carrier means in a position offset to one side of the first rotary brush for rotation on a second axis substantially below said level and parallel to said horizontal axis, the brushes overlapping to an extent that a major portion of at least one of the brushes overlaps the other brush, moving means for moving the carrier means toward the side of the car to move the first rotary brush against the side window and the sill of the car and the second rotary brush against the sill and the side portion of the car below the sill, and drive means for rotating the brushes in directions in which the portions of the brushes engaging the car are moving upwardly.

References Cited

UNITED STATES PATENTS

| | | |
|---|---|---|
| 1,412,732 | 4/1922 | Young. |
| 3,238,551 | 3/1966 | Cirino et al. |
| 3,332,098 | 7/1967 | Smith. |

FOREIGN PATENTS

| | | |
|---|---|---|
| 919,655 | 2/1963 | Great Britain. |

EDWARD L. ROBERTS, Primary Examiner.

U.S. Cl. X.R.

15—53